United States Patent
Allen et al.

(10) Patent No.: US 7,743,888 B2
(45) Date of Patent: Jun. 29, 2010

(54) TRANSMISSION AND TRANSFER CASE HAVING INTEGRATED LUBRICATION SYSTEMS

(75) Inventors: Timothy Allen, Livonia, MI (US); Steven Thomas, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1769 days.

(21) Appl. No.: 10/706,661

(22) Filed: Nov. 12, 2003

(65) Prior Publication Data

US 2005/0098386 A1    May 12, 2005

(51) Int. Cl.
*F01M 11/00* (2006.01)

(52) U.S. Cl. .................... 184/6.12; 184/6.28; 74/606 A; 180/223

(58) Field of Classification Search .............. 184/6.12, 184/6.28; 74/606 A; 475/159; 180/233; 474/91
See application file for complete search history.

(56) References Cited

U.S. PATENT DOCUMENTS

| | | | |
|---|---|---|---|
| 3,800,913 A | 4/1974 | Schmitt | |
| 4,726,262 A | 2/1988 | Hayakawa et al. | |
| 4,938,306 A | 7/1990 | Sumiyoshi et al. | |
| 5,115,887 A * | 5/1992 | Smith | 184/6.4 |
| 5,295,919 A | 3/1994 | Kobayashi | |
| 5,702,319 A * | 12/1997 | Baxter, Jr. | 475/88 |
| 5,819,192 A * | 10/1998 | Wakahara et al. | 701/67 |
| 5,827,145 A * | 10/1998 | Okcuoglu | 475/88 |
| 5,836,847 A | 11/1998 | Pritchard | |
| 6,292,732 B1 | 9/2001 | Steinmetz et al. | |
| 6,311,797 B1 * | 11/2001 | Hubbard | 180/165 |
| 6,458,056 B1 | 10/2002 | Brown et al. | |
| 6,464,612 B2 | 10/2002 | Frost | |
| 6,582,331 B1 | 6/2003 | Baxter, Jr. | |
| 6,679,799 B2 | 1/2004 | Bowen | |
| 6,953,411 B2 * | 10/2005 | Burns et al. | 475/231 |
| 2004/0220009 A1 | 11/2004 | Yu et al. | |

* cited by examiner

*Primary Examiner*—David M Fenstermacher
(74) *Attorney, Agent, or Firm*—David B. Kelley; MacMillan, Sobanski & Todd, LLC

(57) ABSTRACT

In a driveline for a motor vehicle that includes an automatic transmission having an output shaft that drives a transfer case, an oil sump located in the transfer case, a pump supplied with fluid from the first sump, delivers fluid to a lubrication circuit in the transmission, a second sump supplies fluid to the inlet of a second pump, whose output supplies a second lubrication circuit located in the transfer case. Both of the hydraulic pumps are continually driveably connected to a set of the vehicle's drive wheels.

17 Claims, 3 Drawing Sheets

TRANSMISSION AND TRANSFER CASE HAVING INTEGRATED LUBRICATION SYSTEMS

BACKGROUND OF INVENTION

1. Field of the Invention

This invention relates to a driveline that directs power to forward and rear axles, in particular it pertains to a lubrication system for a transmission and transfer case.

2. Description of the Prior Art

A conventional motor vehicle equipped with an automatic transmission should be towed with its drive wheels out of contact with the ground, preferably with the vehicle supported on a tow truck or with the drive wheels supported and the non-driven wheels on the ground. A similar requirement applies also to a vehicle having an automatic transmission and a transfer case. If the vehicle were towed with the drive wheels on the ground, certain transmission and transfer case components would be driven in rotation by reverse torque from the drive wheels. With the engine stopped, the transmission pump cannot supply lubrication fluid to rotating components of the transmission. In order to avoid damage to these components due to lack of lubrication to the rotating components, the distance and speed at which such a vehicle can be towed with the drive wheels in contact with the ground is limited. Frequently there is a need for such vehicles to be towed long distances at highway speed with all the wheels contacting the road surface.

A transfer case usually includes a planetary gear set for producing either a "high" range, in which the transfer case output is driven at the same speed as the input, or a "low" range, in which the output is driven slower than its input speed. The 4×2 and 4×4 states of the transfer case are usually selected or controlled manually by the vehicle operation by operating a lever or switch. At a first position of the selector, the planetary gear set of the transfer case directs power from the transmission output to a front drive axle. At a second position of the selector, the transfer case directs power to both a front drive axle and a rear drive axle, the 4×4 drive mode.

The oil sump of a transfer case may fill with transmission fluid used to lubricate critical rotating components and to operate the hydraulically actuated clutches and brakes. Typically there is no gravity feedback of oil to the transmission sump from the transfer case sump because the transfer case sump is located at a lower elevation than the transmission sump, or because the hydraulic path between them is obstructed to fluid flow.

Yet it is desirable to improve the fuel economy and function of a vehicle equipped with a driveline having a transfer case and an automatic transmission by reducing hydraulic drag losses in the driveline caused by passing rotating components through fluid contained in a transfer case oil sump. A drive mechanism for transmitting power from the output shaft of the transfer case to the forward drive shaft typically rotates with an output sprocket wheel and chain moving in the sump. By operating with the level of oil in the sump at a low level or with a dry sump, the fuel economy of the vehicle can be improved by avoiding hydraulic drag losses.

In order to improve fuel economy it is desirable that the sump of the transfer case be drained continually and its contents be used to supply lubrication fluid to the transmission. Furthermore it is desirable that fluid that collects in the transmission oil sump be supplied to lubricate the transfer case.

SUMMARY OF INVENTION

It is an advantage of this invention that oil in the sump of the transfer case is continually carried away from the sump so that the sump runs virtual dry, thereby reducing or eliminating the drag losses associated with the components rotating through the oil located in the transfer case sump.

It is another advantage of this invention that a vehicle driveline permits the vehicle to be towed with any or all of its drive wheels in contact with the ground.

It is yet another advantage that a vehicle driveline according to this invention has lubrication circuits in the transfer case and transmission case that supply lubrication fluid to components that rotate while the vehicle is being towed with any of its drive wheels in contact with the ground. It is yet another advantage that a hydraulic circuit continually lubricates rotating components while towing the vehicle with all its wheels, including the drive wheels, in contact with the ground so that no damage to rotating components occurs.

In realizing these advantages, a driveline according to this invention includes a transfer case having an output shaft driveably connected to at least one of the drive wheels, a first circuit for carrying hydraulic fluid to the transfer case, and a second sump for holding fluid; a power transmission having a first sump for holding fluid and a second circuit for carrying hydraulic fluid to the transmission; a first hydraulic pump driveably connected to said output shaft, having an inlet supplied with fluid from the first sump and an outlet hydraulically connected to a first circuit; and a scavenge pump driveably connected to said output shaft, having an inlet supplied with fluid from the second sump and an outlet hydraulically connected to the second lubrication circuit.

In another embodiment, in which a vehicle driveline includes a power transmission and transfer case, the transmission having a first sump and the transfer case having a second sump, a hydraulic circuit according to this invention includes a first hydraulic pump having an inlet hydraulically connected to the first sump and an outlet hydraulically connected to a first lubrication circuit; and a second hydraulic pump having an inlet hydraulically connected to the second sump and an outlet hydraulically connected to a second lubrication circuit.

DETAILED DESCRIPTION OF THE PREFERRED EMBODIMENTS (S)

Figure 1:
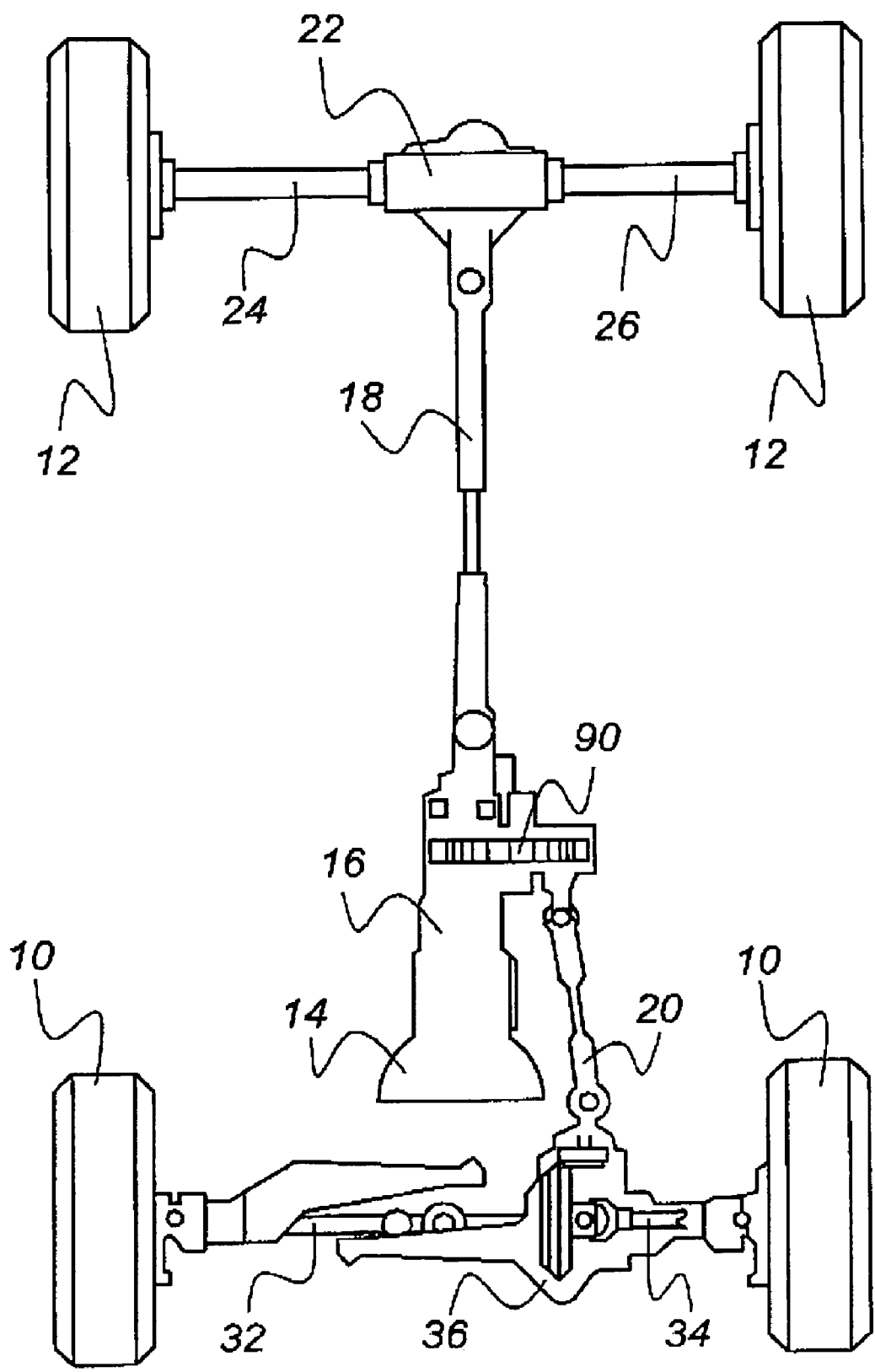
FIG. 1 is a top view of a motor vehicle driveline having a transmission, transfer case, and drive shafts extending to the front wheels and rear wheels.

Referring first to FIG. 1, the powertrain of a motor vehicle, to which the present invention can be applied, includes front and rear wheels 10, 12, a power transmission 14 for producing multiple forward speed ratios and reverse drive, and a transfer case 16 for driveably connecting the transmission output to a rear drive shaft 18 when a two-wheel drive operating mode is selected and for concurrently connecting the transmission output to both the front drive shaft 20 and rear drive shaft 18 when a four-wheel-drive mode of operation is selected. Shaft 18 transmits power to a rear wheel differential mechanism 22, from which power is transmitted differentially to the rear wheels 12 through axle shafts 24, 26, which are contained within a differential housing. The front wheels are driveably connected to right-hand and left-hand axle shafts 32, 34, to which power is transmitted from the front drive shaft 20 through a front differential 36.

Figure 2A:
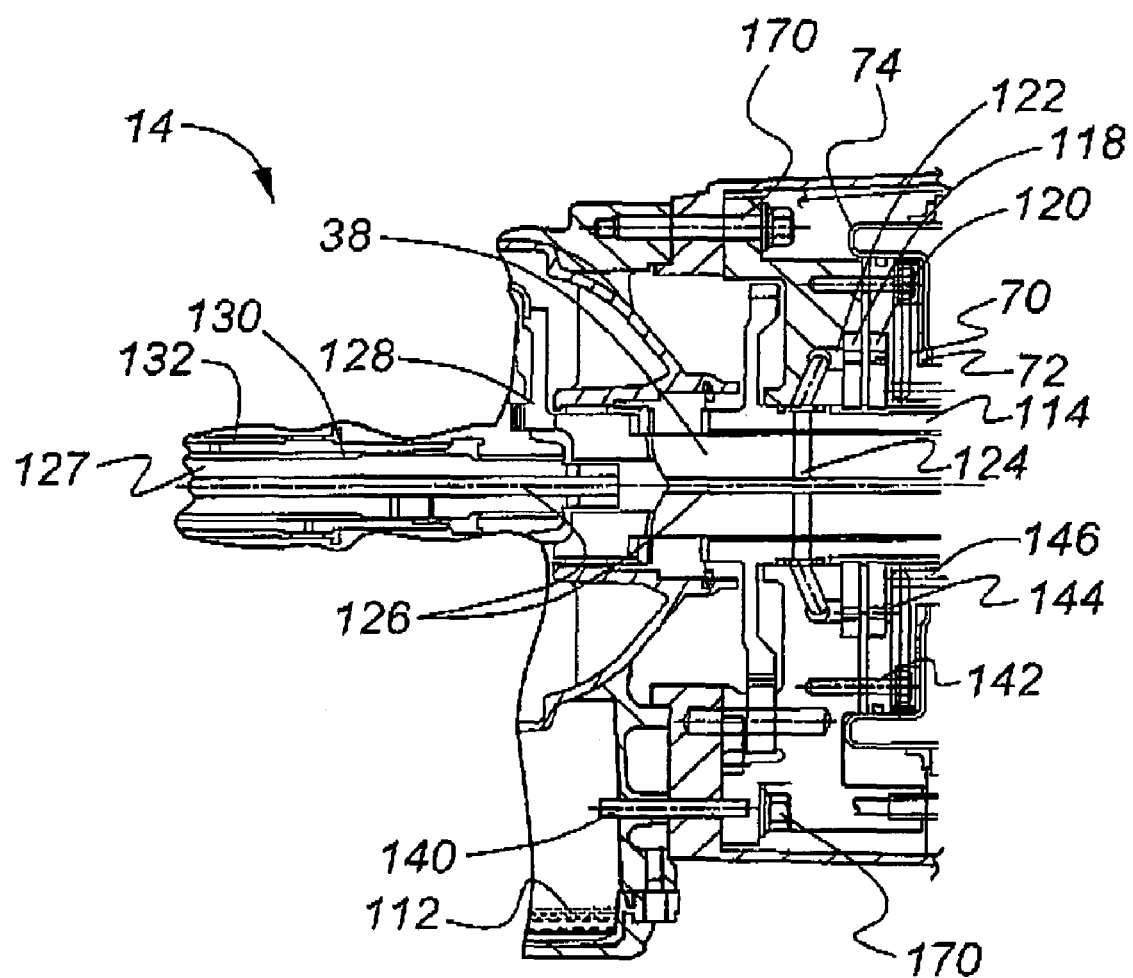
FIGS. 2A and 2B are left-hand and right-hand portions, respectively, of a cross sectional side view showing an integrated transfer case and automatic transmission, to which this invention is applied.
Figure 2B:
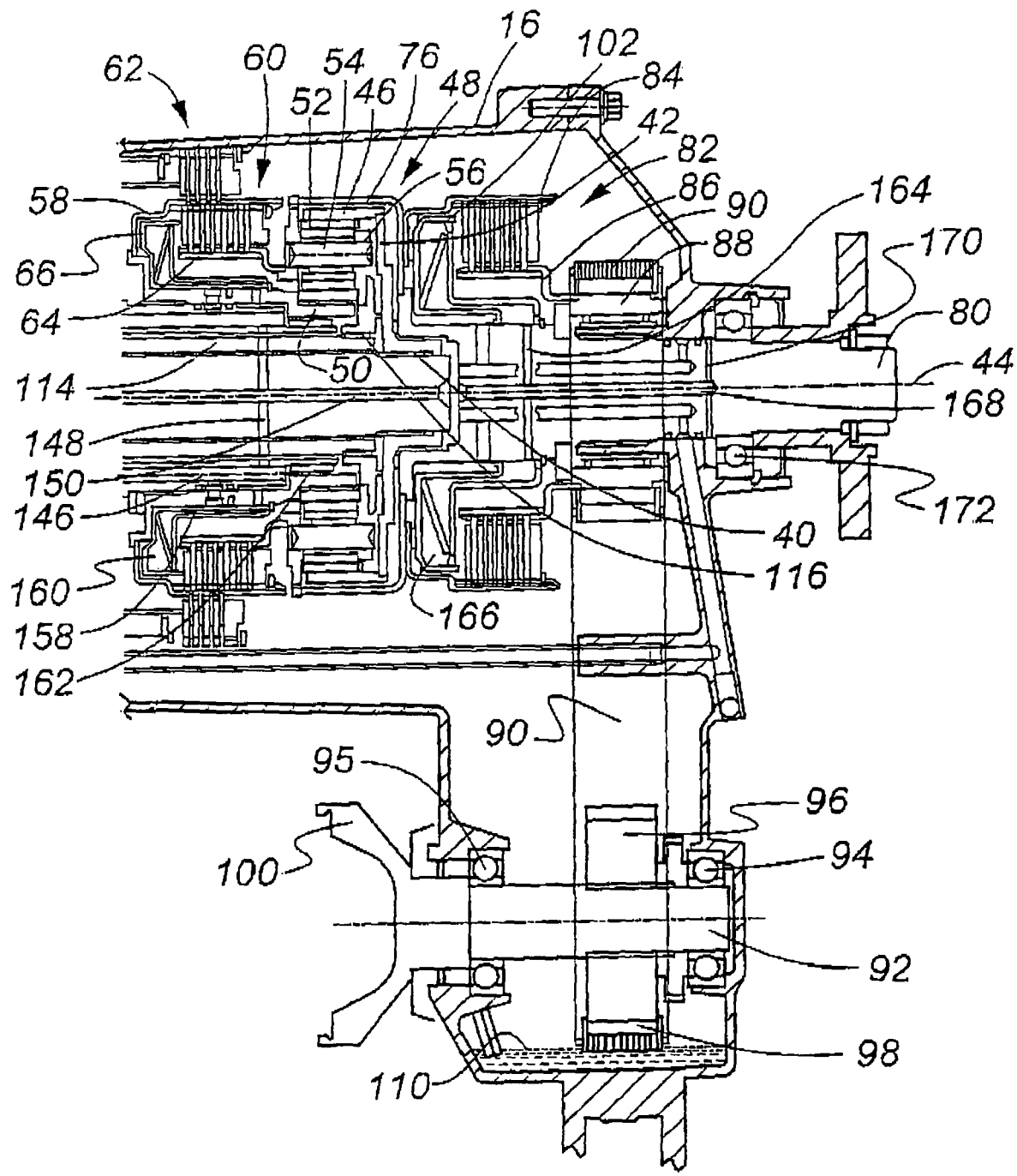

Referring now to FIGS. 2A and 2B, the output shaft 38 of the transmission is drivable connected through a spline 40 to a radial arm 42 that rotates about the axis 44 fixed to the ring gear 46 of a planetary gear set 48, located in the transfer case 16. The planetary gear set 48 further includes a sun gear 50, which is in continuous meshing engagement with a set of planet pinions 52, which are supported for rotation on a stub shaft 54, supported on a carrier 56. Each of the planet pinions 52 is in continuous meshing engagement with sun gear 50 and ring gear 46.

Sun gear 50 is driveably connected to a drum 58, located between a high range clutch 60 and a low range brake 62. Drum 58 provides a surface surrounding an arrangement of alternating friction discs and spacer plates. The spacer plates are joined by a spline to the inner surface of drum 58; the friction discs are splined to the outer surface of a drum 64, which is driveably connected to carrier 56. Clutch 60 is engaged when pressurized hydraulic fluid is supplied to a cylinder, causing piston 66 to move rightward, thereby forcing the friction discs and spacer plates into mutual frictional driving contact. When this occurs clutch 60 is engaged and a drive connection is established through the clutch between sun gear 50 and carrier 56.

Friction discs of brake 62 are engaged by a spline formed on the outer surface of drum 58, and those discs are arranged alternately with spacer plates, which are splined to the inner surface of the transfer case 16.

A valve body 70 provides a radially directed wall of a hydraulic cylinder 72, which when pressurized with hydraulic fluid forces piston 74 to move rightward, thereby producing a drive connection through brake 62 between drum 58 and the transfer case 68. When brake 62 is engaged, sun gear 50 is held against rotation on case 16.

When high range clutch 60 is engaged and brake 62 is released, the carrier 56 of planetary gear set 48 rotates at the same speed as transmission output shaft 38 because sun gear 50 and carrier 56 are drivably connected together and rotate at the same speed. This produces the "high" range of operation of the transfer case.

The planetary gear set is controlled to produce also a "low" operating range by engaging brake 62 and disengaging brake 60. Then brake 62 holds sun gear 50 against rotation and provides a torque reaction on the transfer case 16, ring gear 46 is driven at the speed of transmission output shaft 38, and carrier 56 is driven at a slower speed than the speed of shaft 38.

The output of planetary gear set 48, which is carrier 56, is driveably connected through a drum 76 to the transfer case output shaft 80. Rear drive shaft 18 is continually driveably connected to shaft 80. Drum 76 is fixed to an element of 4×4 clutch 82, which includes spacer plates and friction discs arranged alternately and splined, respectively, to a drum 84 and to a component 86, which is fixed to a sprocket wheel 88. Sprocket 88 is rotatably supported about the axis 44 and formed with external sprocket teeth that are driveably engaged by a drive belt or chain 90. A stub shaft 92, rotatably supported on the transfer case by bearings 94, 95, rotatably supports a output sprocket wheel 96, formed with external sprocket teeth 98, engaged by drive chain 90. The chain drive mechanism transmits power between output shaft 80 and shaft 92 when clutch 82 is engaged, thereby driveably connecting sprocket wheel 88 and carrier 56.

Shaft 80 is formed with a flange, adapted for connection to rear drive shaft 18, which is connected through rear axle differential 22 to the rear wheels 12 of the vehicle. Shaft 92 is formed with a yolk 100 adapted to be connected to front drive shaft 20, which transmits power through front axle differential 36 to the front drive wheels 10 of the vehicle.

The friction discs and spacer plates of the servo that actuates clutch 82 are mutually frictionally engaged to produce a drive connection between carrier 56 and sprocket wheel 88 when pressurized hydraulic fluid is applied to the hydraulic cylinder within which piston 102 is located. When clutch 82 is engaged, piston 102 moves rightward, thereby producing a releasable drive connection between drums 84 and 86, thereby driveably connecting carrier 56 and output sprocket wheel 88. When hydraulic pressure is vented from clutch 82, the clutch disengages and power is transmitted from carrier 56 through drum 76 directly to shaft 80.

The transfer case 16 contains a hydraulic fluid or oil sump 110, where hydraulic transmission fluid can accumulate at a relatively low elevation of the transfer case. Fluid that accumulates there passes first through a second lubrication circuit in the transfer case and then by the effect of gravity to sump 110. That second lube circuit supplies relatively cool transmission fluid to lubricate surfaces of the transfer case that rotate both when the engine is producing power and driving the wheels and when the drive wheels are driving the transfer case output. When the vehicle is off and the vehicle is being towed with its drive wheels contacting the ground, the lube circuit in the transfer case supplies lubrication fluid to surfaces that support rotating components of the transfer case 16.

Similarly transmission case 14 contains a transmission oil sump 112 where transmission fluid accumulates at a relatively low elevation by gravity feed from the portions of the transmission located higher than sump 112.

A sleeve shaft 114 surrounds the transmission output shaft 38 and is drivable connected through a spline 116 to carrier 56. Carrier 56 is continually secured to output shaft 80 and to sleeve shaft 114. Shaft 114 drives rotating elements of two hydraulic pumps, scavenge pump 118 and lube pump 120. Preferably pumps 118 and 120 are G-rotor pumps.

The inlet of scavenge pump 118 is hydraulically connected through passages to sump 110. Pump 118 has an output 122, which is connected to the second lubrication circuit by a radially directed passage 124 to an axial passage 126 formed in transmission output shaft 38 and an intermediate shaft 127. Passage 126 of the second lubrication circuit supplies hydraulic fluid from pump 118 through various axial and radial passages 128, 130, 132 to the bearings and support surfaces of rotating components located in the transmission case 14. In this way hydraulic fluid is continually drawn from the transfer case sump 110 and is supplied by pump 118 to a the second lubrication circuit located in the transmission case. Pump 118 is driven continually by positive engine torque or, when the engine is stopped, by negative torque from the rear drive wheels.

Lube a pump 120 continually draws hydraulic fluid from the transmission sump 112 and supplies relatively cool transmission fluid for lubrication purposes to a first lubrication circuit located in the transfer case 68. Fluid from sump 112 flows through passages 140, 142 to the inlet of lube pump 120, located adjacent scavenge pump 118 and also driven by sleeve shaft 114. The outlet 144 of pump 120 is hydraulically connected to the first lubrication circuit through passages 146, 148, 150 to various radial and axial passages 158, 162, 164, 170 that lead to components of the transfer case. Radial passage 148 directs lubricating fluid to the friction discs and spacer plates of clutch 60 and brake 62, through axial passage 158 to balance dam 160, and through axial passage 162 to carrier 56 and stub shaft 54. Radial passage 164 directs lube fluid to balance dam 166 and to the discs and spacer plates of clutch 82. Axial passage 168 and radial passage 170 carry lube fluid to the bearing 172 that supports output shaft 80 on case 16.

Sleeve shaft 114 and pumps 118, 120 are continually driven by the transmission output shaft 38 when power is being transmitted from the engine through the transmission and transfer case to the drive wheels of the vehicle. When the engine is off and the vehicle is being towed with its drive wheels in contact with the ground, sleeve shaft 114 is driven by output shaft 80, through carrier 56, ring gear 46 and spline 40. In either of these two conditions, sleeve shaft 114 is continually rotating and drives pumps 118 and 120. Therefore, the lubrication circuits in the transmission and transfer case are continually supplied with fluid from sumps 110, and 112.

Preferably a solenoid-operated valve discontinues lubrication fluid flow to the 4×4 on-demand clutch 82 from pump 120 during operation of the transfer case in the 4×2 mode. Further, the flow of lubrication fluid from pump 120 to the transfer case components is not a steady stream but instead is pulsed at short intervals sufficient to supply adequate flow rate in order to reduce the pump load.

Although the form of the invention shown and described here constitutes the preferred embodiment of the invention, it is not intended to illustrate all possible forms of the invention. Words used here are words of description rather than of limitation. Various changes in the form of the invention may be made without departing from the spirit and scope of the invention as disclosed.

We claim:

1. A system for lubricating components of a drive line adapted to drive the wheels of a motor vehicle, the system comprising:
    a power transmission including a first output;
    a first lubrication circuit;
    a second lubrication circuit;
    a first sump for containing hydraulic fluid;
    a transfer case adapted for a drive connection to the first output, including a second sump for containing hydraulic fluid, and a second output adapted for a drive connection to at least one driven wheel;
    a first pump driveably connected to the second output, hydraulically connected to the first sump and the first lubrication circuit; and
    a second pump driveably connected to the second output, hydraulically connected to the second sump and the second lubrication circuit.

2. The system of claim 1, wherein the first lubrication circuit and the first pump are located in the transfer case.

3. The system of claim 1, wherein the first lubrication circuit is located at least partially in the transfer case.

4. The system of claim 1, wherein the second lubrication circuit is located at least partially in the transmission.

5. The system of claim 1, wherein:
    the first pump and second pump are located in the transfer case;
    the first lubrication circuit is located at least partially in the transfer case; and
    the second lubrication circuit is located at least partially in the transmission.

6. A system for lubricating components of a drive line adapted to drive the wheels of a motor vehicle, the system comprising:
    an input;
    a first output driveably connected to the input;
    a first sump for containing a source of hydraulic fluid;
    a first lubrication circuit;
    a lube pump driveably connected to the first output and hydraulically connected to the first lubrication circuit; and
    a scavenge pump driveably connected to said first output and hydraulically connected to the first sump.

7. The system of claim 6, further comprising:
    a second output;
    a transfer drive mechanism driveably connected to the first output and second output, at least a portion of the drive mechanism located in relation to the first sump for movement through the fluid source.

8. The system of claim 6, further comprising:
    a second output;
    a clutch having a first set of friction elements driveably connected to first output, and a second set of friction elements adapted driveably to engage and disengage the first set of friction elements, the clutch alternately driveably connecting and disconnecting the first output and second output; and
    the first lubrication circuit further comprises fluid passages hydraulically connecting the lube pump to the first set of friction elements and second set of friction elements.

9. The system of claim 6, further comprising:
    a gearset including a sun gear, a ring gear, a carrier, and a set of planet pinions supported for rotation on the carrier, each pinion in meshing engagement with the sun gear and ring gear and journalled on a stub shaft supported on the carrier; and
    the first lubrication circuit further comprises fluid passages hydraulically connecting the lube pump to at least a portion of the components of the gearset.

10. The system of claim 6, further comprising:
    a bearing supporting the first output on the transfer case; and
    the first lubrication circuit further comprises fluid passages hydraulically connecting the lube pump to the bearing.

11. The system of claim 6, further comprising:
    a balance dam; and
    the first lubrication circuit further comprises fluid passages hydraulically connecting the lube pump to the balance dam.

12. The system of claim 6, further comprising:
    a second output;
    a transfer drive mechanism including a first sprocket wheel journalled for rotation on the first output, a second sprocket wheel spaced from the first sprocket wheel and secured to the second output, and a drive chain driveably engaged with the first sprocket wheel and second sprocket wheel and located in relation to the first sump for movement through the fluid source.

13. A method for supplying lubrication to a transmission and transfer case, the transmission and transfer case each having a sump for containing hydraulic fluid, the transfer case having an output adapted for a drive connection to at least a first set of driven wheels, the method comprising the steps of:
    driveably connecting a first pump and a second pump to the output;
    defining a first circuit for carrying lubrication fluid in the transfer case;

defining a second circuit for carrying lubrication fluid in the transmission;

hydraulically connecting the first pump to the transmission sump and to the first circuit; and hydraulically connecting the second pump to the transfer case sump and to the second circuit.

14. The method of claim 13, wherein the step of defining a first circuit, further comprises the step of:

establishing fluid passages connecting the first pump and a bearing located in the transfer case for supporting the output on the transfer case.

15. The method of claim 13, wherein the step of defining a first circuit, further comprises the step of:

establishing fluid passages connecting the first pump and a clutch located in the transfer case for alternately driveably connecting and disconnecting the output and a second output.

16. The method of claim 13, wherein the step of defining a first circuit, further comprises the step of:

establishing fluid passages connecting the first pump and a balance dam located in the transfer case.

17. The method of claim 13, wherein the step of defining a second circuit, further comprises the step of:

establishing fluid passages connecting the second pump and a surface supporting rotating components located in the transmission.

* * * * *